United States Patent Office 3,437,569
Patented Apr. 8, 1969

3,437,569
POLYMERIZATION OF AROMATIC
HYDROCARBONS
David G. Walker, Baytown, Tex., and Norvell E. Wisdom,
Jr., Elizabeth, N.J., assignors to Esso Research and
Engineering Company, a corporation of Delaware
No Drawing. Filed May 12, 1966, Ser. No. 549,482
Int. Cl. C08f 1/00, 13/00; B01k 1/00
U.S. Cl. 204—59
14 Claims The present invention relates to a new process for polymerizing aromatic compounds. More particularly, this invention relates to the preparation of polymeric aromatic hydrocarbons by a process which comprises electrolyzing a solution of an aromatic compound and a ternary complex having the following general formula:

R:HX:2AlX₃ wherein R is an aromatic compound and X is a halogen, i.e. chlorine or bromine, whereby the aromatic compound in solution is polymerized.

The excellent thermal stability and high melting point of aromatic polymers has led to wide interest in these materials as fiber intermediates and surface coating or ablative coating intermediates. Linear polymers, such as p-sexiphenyl, may be used in fibers and is also subject to use as a moderator in nuclear reactors where thermal stability is of primary importance. Previous methods for polymerizing aromatic hydrocarbons have been based on classical laboratory synthesis techniques. For example, p-sexiphenyl has been prepared by such methods as the Ullman coupling, Fittig reaction, or Grignard synthesis. These reactions have suffered from basic limitations involving poor yields, difficult purification procedures, severe reaction conditions, multistep syntheses, or gross product mixtures due to competing reactions. More recently, p-sexiphenyl and p-polyphenyl have been synthesized by reacting biphenyl or benzene, respectively, with chlorides, e.g. aluminum chloride-cupric chloride, ferric chloride and molybdenum pentachloride; however, this process was also limited by relatively poor yields. A review of the prior art concerning the preparation of p-sexiphenyl may be had by reference to Kovacic and Lange, J. of Org. Chem. 29, 2416–2420 (1964). Prior art preparation of p-polyphenyl has involved the reaction of p-dichlorobenzene with metals, e.g. sodium, mercury. This process relies on the splitting out of chlorine from the feedstock, to form metal chlorides, and the addition of benzene rings at the para position. However, this process suffered from the handling of hazardous materials, low yields and the production of p-polyphenyl containing only about ten units. Recently, a method for preparing polyphenyl by electrolyzing a solution of benzene, hydrogen fluoride and water or potassium fluoride has been developed. However, this technique results in low yields, polymer contamination with oxygen and fluorine and depends upon the conductivity of a two-phase system, Shepard and Daniels, J. Pol. Science 4, Part A–1, 511–518 (1966). It has now been discovered that aromatic hydrocarbon polymers may be easily prepared and recovered in high electrochemical yields by the process of this invention.

Thus, in accordance with this invention, high yields of polymeric aromatic hydrocarbons may be prepared by electrolyzing a solution comprising a $C_6$–$C_{20}$ aromatic compound and a ternary complex having the formula R:HX:2AlX₃, wherein R is a $C_6$–$C_{20}$ aromatic compound at least as basic as the aromatic to be polymerized, and X is selected from the group consisting of chlorine and bromine. The overall electrolytic reaction may be illustrated, with respect to the preparation p-sexiphenyl, by the following expression:

$$3C_{12}H_{10}(biphenyl) \rightarrow C_{36}H_{26}(p\text{-sexiphenyl}) + 2H_2 \quad (1)$$

with p-sexiphenyl being produced at the anode and hydrogen gas at the cathode.

The ternary complex used in this invention has many interesting properties, among which two are particularly important to this process: (1) the ability to exist as an ionic phase according to the following equation:

$$R:HX:2AlX_3 \rightleftharpoons (R-H)^+ + (Al_2X_7)^- \quad (2)$$

which imparts a relatively high degree of electrical conductivity to the ternary complex, thereby allowing the ternary complex to function as the electrolyte in the electrolysis reaction; (2) the ability to dissolve substantial amounts of aromatic compounds, over and above the amount required to form the ternary complex. The dissolved aromatic compounds may be referred to as excess aromatics and the solution produced thereby will be referred to as the complex phase.

The polymers which may be formed by utilizing the process of this invention are quite varied and dependent upon the material used as the excess aromatic in solution. Generally, the excess aromatic may be a $C_6$–$C_{20}$ aromatic compound. Preferably, the aromatic may be selected from the group consisting of benzene, biphenyl, naphthalene, alkyl substituted benzenes, naphthalenes, and biphenyls, and halo derivatives thereof, the hydrocarbon compounds being preferred. While alkyl benzenes, naphthalenes, and biphenyls may generally be used in this process, it is preferred to employ the lower alkyl substituted aromatics, particularly the methyl benzenes, naphthalenes, and biphenyls, and more particularly the methyl benzenes, in order to reduce side reactions involving isomerization and alkylation. Examples of excess hydrocarbons and the polymers produced therefrom are as follows: p-polyphenyl from benzene, p-sexiphenyl from biphenyl, the dimer:

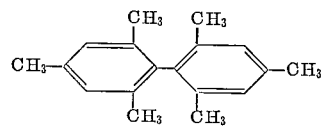

from mesitylene,
and various dimers, trimers, and higher oligomers from ferrocene, o-xylene, m-xylene, p-xylene, 1,2,4-trimethyl benzene, 1,2,4,5-tetramethyl benzene, chlorobenzene, and the like. The polymers produced herein are normally characterized by the loss of hydrogen at the coupling site.

The ternary complex which functions as the electrolyte in this process is represented by the formula:

R:HX:2AlX₃ wherein R is a $C_6$–$C_{20}$ aromatic compound at least as basic, and preferably more basic than the aromatic to be polymerized. Preferred aromatic compounds are selected from the group consisting of benzene, biphenyl, naphthalene, alkyl benzenes, naphthalenes, and biphenyls, and halo derivatives thereof, preferably a hydrocarbon, more preferably $C_8$–$C_{12}$ alkyl benzenes, and still more preferably $C_9$–$C_{12}$ alkyl benzenes; and X is selected from the group consisting of chlorine and bromine. The basicity of a compound, as used herein, designates the tendency of that compound to accept a proton, i.e. the greater the basicity, the greater the tendency to accept a proton. Illustrative of the aromatic hydrocarbons which may be used as R in the ternary complex and listed in the order of increasing basicity are: benzene, biphenyl, toluene, xylene, pseudocumene, hemimellitene, durene, mesitylene, prehnitene, isodurene, pentamethylbenzene, hexamethylbenzene. Other compounds which also may be used are: isopropyl benzene, 1,3,5-dimethylethylbenzene, the ethyl toluenes, methylnaphthalene, dimethylnaphthalene, ethylbenzene. A review of the relative basicites of methylbenzenes and the method used for determining basicity is presented in Ehrenson, J. Am. Chem. Soc. 84, 2681–2687 (1962). For example, when biphenyl is the excess hydrocarbon, R may be biphenyl and preferably is more basic, e.g. toluene. However, more highly substituted alkyl benzenes, i.e., the $C_9$–$C_{12}$ alkyl benzenes, are normally preferred in p-sexiphenyl production.

The ternary complex may be prepared in substantially pure form by mixing a suitable aromatic compound, as described above, with a stoichiometric excess of HCl or HBr and an aluminum halide, i.e. $AlCl_3$, $AlBr_3$, at a temperature between −50° C. and +30° C. A preferred method for preparing the ternary complex consists of mixing the aromatic compound with an anhydrous aluminum halide powder at room temperature. The mixture is stirred and anhydrous HCl or HBr is allowed to bubble through the mixture. It is necessary to provide a stoichiometric excess of both the hydrogen halide and aluminum halide to insure that all of the aromatic compound will be reacted. (The use of less than a stoichiometric amount of aluminum halide will tend to the formation of monomer complexes, wherein the aromatic:hydrogen halide:aluminum halide ternary compound will form in the mole ratio of 1:1:1. Impure compounds with an HX:$AlX_3$ ratio of less than 1:2 may also form, but are not desirable in the process of this invention. The monomer complexes are not applicable to the process of this invention. Electrolysis of an aromatic saturated monomer complex yields hydrogen evolution at the cathode and chlorine evolution at the anode along with the formation of chlorinated products at the anode.) Substantially pure ternary complexes prepared by either of the foregoing procedures will be saturated with respect to hydrogen halide and aluminum halide; however, the presence of these compounds at saturation will be small and will not be detrimetnal to the process of this invention.

The complex phase may be readily prepared by mixing excess aromatic with the ternary complex. Since the ternary complex is capable of dissolving excess aromatics, the complex phase will comprise a solution of excess aromatic and ternary complex. Normally, the ternary complex is capable of dissolving about 5 to 7 moles of excess aromatic before saturation, depending upon the excess aromatic employed. However, in the case of biphenyls or naphthalenes, the ternary complex will dissolve only about 3 moles of excess aromatic. In ordinary circumstances the complex phase should comprise at least 0.5 moles, and preferably 0.1 mole of excess aromatic per mole of ternary complex. Particularly preferred, however, is a ternary complex saturated with excess aromatic. Addition of excess aromatic above that required to form a saturated complex phase will not be deleterious, but will not enter into the electrolysis reaction since a separate nonconductive phase containing the excess aromatic will form. As noted, the ternary complex is capable of dissolving excess aromatic hydrocarbons. Therefore, the preparation of the complex should be carried out to keep amount of excess R, i.e. over and above that required to form the ternary complex, to a minimum, thereby avoiding undesirable side reactions during electrolysis.

The electrolysis may be carried out in any suitable type of cell, either with or without a diffusion hindering membrane. The aromatic polymer will form at the anode, or in the anode compartment when a membrane is employed. The anode is preferably selected from the platinum group metals, i.e. platinum, palladium, rhenium, ruthenium, osmium, iridium, or tantalum. Platinum, however, is particularly preferred. The cathode may be of any convenient material, e.g. aluminum, carbon; however, the platinum group metals are also preferred for the cathode. It is also possible, and in some instances economically desirable, to utilize base metals as the electrodes. When using base metals, they are preferably plated with one of the platinum group metals.

Diffusion hindering membranes may be utilized, if desirable. In general, such membranes may be of any material that is chemically inert to the ternary complex and will form a diffusion barrier while allowing ion transfer. Examples of such membranes are numerous, among which are: fritted glass, sintered glass, asbestos, porous ceramics, e.g. Alundum, zirconia, porous plastic e.g. cellophane, paper products, e.g. parchment, perforated metals, and the like. When a diffusion hindering membrane is used, the ternary complex can be used in both compartments to function as the electrolyte. However, if desirable, the ternary complex need only be used in the anode compartment, while another electrolyte can be used in the cathode compartment. Generally, any electrolyte may be utilized in the cathode compartment which will not destroy the ternary complex at the interface. A preferred electrolyte is the monomer complex, which inhibits side reactions and produces only hydrogen at the cathode.

The operating conditions for the electrolysis reaction are not critical and may vary over a wide range. The reaction temperature need only be such that the reaction is effected in the liquid phase. Generally, however, temperatures will range from about −10° C. to about +100° C., preferably about 0° C. to 50° C., and still more preferably, at room temperature, i.e. about 18–26° C. Pressure may also vary widely, i.e. from about 0.5 atm. to about 10 atm. and preferably at atmospheric pressure.

Voltage requirements for the electrolysis may vary from about 5–100 volts, although voltage outside of this range may also be used satisfactorily. Due to voltage requirements for overcoming resistance losses in the electrolytic cell, power requirements may be more easily regulated through the current density. Current density is again not an essential variable, but should be of sufficient value to produce the polymeric material, i.e. generally at least 0.005 amps./$cm.^2$. Since a relatively high current density may result in undesirable side reactions, e.g. formation of halogenated products or production of aluminum at the cathode, it is preferable to operate within a current density range of about 0.005–2.0 amps./$cm.^2$ to avoid such side reactions, and more preferably between about 0.005 and 1.5 amps./$cm.^2$, still more preferably 0.01–0.5 amps./$cm.^2$.

The polymeric material may be recovered by hydrolyzing the complex phase with ice and/or water. A two-phase mixture will result: an inorganic phase comprising water, hydrogen halide, and aluminum halide; and, an organic phase comprising any unreacted excess aromatic, the aromatic from the ternanry complex, and the polymer, either in solution or suspended in the organic phase. The phases may then be separated by any convenient method, e.g. extraction, decanting, etc., and the polymer recovered from the organic phase by extraction, sublimation, distillation, etc.

The following examples will serve to further illustrate the process of this invention; however, no limitations are to be construed other than those incorporated into the appended claims.

Example 1.—Electrolysis of a complex phase of biphenyl and mesitylene:HCl:$2AlCl_3$ In a glass U-tube, 25 ml. solution of the ternary complex mesitylene:HCl:$2AlCl_3$ was saturated with 10 gm. of biphenyl and electrolyzed between two platinum electrodes. An EMF of 10 volts was applied between the electrodes with current varying between 0.6 and 0.4 amps. The current was continued for about 2 hours and was continuously recorded. The contents of the cell were hydrolyzed with ice and water to destroy the complex phase. The organic products remaining after hydrolysis were extracted and the starting materials, biphenyl and mesitylene, were distilled away. From the remaining materials, 6.0 gm. of p-sexiphenyl were recovered. The material was identified by comparison with the properties reported for the known material as previously made by other syntheses. Integration of the current record showed that 1.75 amp hours of charge had passed through the cell. This corresponds to the formation of 6.6 gm. of p-sexiphenyl on the assumption that one electron transfer is required for the removal of each of the four hydrogen atoms required to be removed to convert three biphenyl molecules into one molecule of p-sexiphenyl. The yield then was 91% of that theoretically possible.

Example 2–9

Table I below shows the results of several other experiments in the preparation of p-sexiphenyl:

Examples 10–18

Table II below shows the results of several runs using equipment similar to that in Example 1 and a ternary complex of mesitylene:$HCl:2AlCl_3$. Probable structures were arrived at by examination of spectra and/or other physical and chemical properties of the products and determining the molecular weight by measuring melting point depression in camphor for soluble polymers.

TABLE I

| Example No. | Electrode Arrangement | Temp., °C. | Voltage Range, v. | Current Range, amps. | Ternary Complex a | p-Sexiphenyl Recovered, gm. |
|---|---|---|---|---|---|---|
| 2 | Concentric cylinders, ½" dia. and 1" dia. x 2" high, Pt gauze. | 25–30 | 5–10 | 0.1–0.6 | HMB:$HCl:2AlCl_3$ b | 0.7 |
| 3 | do | 60 | 5–10 | 0.05–2.0 | HMB:$HCl:2AlCl_3$ b | 0.7 |
| 4 | do | 60 | 6–12 | 0.6 | MES:$HCl:2AlCl_3$ c | 0.7 |
| 5 | do | 80 | 8–15 | 1.0 | MES:$HCl:2AlCl_3$ c | 2.0 |
| 6 | 2 cm. x 5 cm. solid Pt, parallel and 3" apart. | 25–30 | 60–120 | 0.6 | HMB:$HCl:2AlCl_3$ c | 0.9 |
| 7 | do | 25–30 | 60–120 | 0.6 | MES:$HCl:2AlCl_3$ | 1.3 |
| 8 | do | 25–30 | 30 | 0.2 | (d) | 0.7 |
| 9 | 2 cm. x 5 cm. solid Pt, parallel and 3" apart, electrodes 12" apart. | 25–30 | 75–100 | 0.2 | (e) | 7.5 | a Saturated with biphenyl.
b Hexamethyl benzene.
c Mesitylene.
d Ion-exchange membrane separated electrodes:
   Anode compartment, MES:$HCl:2AlCl_3$
   Cathode compartment, HMB:$HCl:AlCl_3$
e Fine glass frit separator between electrodes:
   Anode compartment, MES:$HCl:2AlCl_3$
   Cathode compartment, HMB:$HCl:AlCl_3$

TABLE II

| Example No. | Excess Aromatic | Product Characteristics |
|---|---|---|
| 10 | Ferrocene (dicyclopentadienyl iron II). | Infusible, insoluble brown solid containing iron, gives iron powder on pyrolysis; probable structure: |
| 11 | Benzene | Insoluble, infusible, chemically inert brown solid; identified as p-polyphenyl by infrared analysis: (n~50 or more) |
| 12 | Toluene | Hydrocarbon soluble, low volatility, high melting solid; probable structure: (n~4) |
| 13 | o-Xylene | Hydrocarbon soluble, melting point=130° C., condensed ring, complex aromatic mixture. |
| 14 | m-Xylene | Hydrocarbon soluble solid, low volatility; probable structure: |
| 15 | p-Xylene | Hydrocarbon soluble, low melting solid, average molecular weight about 75; probable structure: 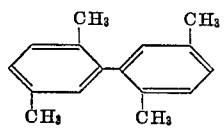 |

TABLE II—Continued

| Example No. | Excess Aromatic | Product Characteristics |
|---|---|---|
| 16 | Mesitylene | Sublimable white crystalline solid, identified as shown by measuring melting point depression in camphor: |
| 17 | 1,2,4-trimethyl benzene | Hydrocarbon soluble, low volatility, solid; probable structure: |
| 18 | 1,2,4,5-tetramethyl benzene | Hydrocarbon soluble, low volatility solid, probable structure: |

What is claimed is:

1. A process for preparing polymeric aromatic compounds which comprises electrolyzing a liquid solution comprised of a $C_6$–$C_{20}$ aromatic compound and a ternary complex having the formula:

$$R:HX:2AlX_3$$

wherein R is a $C_6$–$C_{20}$ aromatic compound at least as basic as the aromatic in solution and X is selected from the group consisting of chlorine and bromine.

2. The process of claim 1 wherein the aromatic in solution is selected from the group consisting of benzene, biphenyl, naphthalene, alkyl substituted benzenes, naphthalenes and biphenyls, and halo derivatives thereof.

3. The process of claim 2 wherein the aromatic in solution is benzene.

4. The process of claim 2 wherein the aromatic in solution is an alkyl substituted benzene.

5. The process of claim 2 wherein the aromatic in solution is biphenyl.

6. The process of claim 1 wherein the temperature is about −10° C. to about +100° C.

7. The process of claim 1 wherein the molar ratio of excess aromatic to ternary complex is at least about 0.5/1.

8. The process of claim 1 wherein the current density is at least 0.005 amp./cm.$^2$.

9. The process of claim 1 wherein R is selected from the group consisting of benzene, biphenyl, naphthalene, alkyl substituted benzenes, naphthalenes and biphenyls, and halo derivatives thereof.

10. The process of claim 9 wherein R is selected from the group consisting of $C_8$–$C_{12}$ alkyl substituted benzenes.

11. The process of claim 1 wherein a diffusion hindering membrane is employed, thereby creating anode and cathode compartments.

12. The process of claim 11 wherein the ternary complex is employed only in the anode compartment.

13. The process of claim 1 wherein the ternary complex is mesitylene:$HCl$:$2AlCl_3$.

14. The process of claim 1 wherein the ternary complex is hexamethyl benzene:$HCl$:$2AlCl_3$.

References Cited

UNITED STATES PATENTS 3,335,075   8/1967   Borman _____ 204—59
3,386,899   6/1968   Shepherd et al. _____ 204—59

HOWARD S. WILLIAMS, *Primary Examiner.*